(12) United States Patent
Wells

(10) Patent No.: US 10,662,895 B2
(45) Date of Patent: May 26, 2020

(54) AIRCRAFT GAS TURBINE ENGINE NACELLE

(71) Applicant: ROLLS-ROYCE plc, London (GB)

(72) Inventor: John R Wells, Derby (GB)

(73) Assignee: ROLLS-ROYCE PLC, London (GB)

( * ) Notice: Subject to any disclaimer, the term of this patent is extended or adjusted under 35 U.S.C. 154(b) by 320 days.

(21) Appl. No.: 15/593,674

(22) Filed: May 12, 2017

(65) Prior Publication Data

US 2018/0119639 A1 May 3, 2018

(30) Foreign Application Priority Data

May 24, 2016 (GB) .................................. 1609071.4

(51) Int. Cl.
 *F02K 1/09* (2006.01)
 *F02K 3/06* (2006.01)
 *F02K 1/72* (2006.01)

(52) U.S. Cl.
 CPC .................. *F02K 1/09* (2013.01); *F02K 3/06* (2013.01); *F02K 1/72* (2013.01); *F05D 2220/323* (2013.01); *F05D 2240/128* (2013.01); *F05D 2250/43* (2013.01); *F05D 2260/57* (2013.01)

(58) Field of Classification Search
 CPC . F02K 1/09; F02K 1/008; F02K 1/002; F02K 1/06
 See application file for complete search history.

(56) References Cited

U.S. PATENT DOCUMENTS

| | | | |
|---|---|---|---|
| 2,813,395 | A | 11/1957 | Meyer |
| 2,828,602 | A | 4/1958 | Gardiner |
| 2,831,319 | A | 4/1958 | Geary |
| 2,870,602 | A | 1/1959 | Glenn |
| 2,928,234 | A | 3/1960 | Brown |
| 3,046,730 | A | 7/1962 | Petren |

(Continued)

FOREIGN PATENT DOCUMENTS

| | | |
|---|---|---|
| EP | 2 584 184 A2 | 4/2013 |
| GB | 788359 A | 1/1958 |

(Continued)

OTHER PUBLICATIONS

Oct. 12, 2017 Search Report issued in European Patent Application No. 17170872.

(Continued)

*Primary Examiner* — Andrew H Nguyen
(74) *Attorney, Agent, or Firm* — Oliff PLC

(57) ABSTRACT

A fan nacelle for an aircraft gas turbine engine. The nacelle includes an aft nacelle portion including a radially outer surface and a radially inner surface, the radially outer and inner surfaces defining an internal cavity therebetween. The nacelle further includes an aft nacelle segment translatable along a translation vector having an axial component, wherein the aft nacelle segment is configured to translate between a forward deployed position in which the nacelle defines a first primary fan nozzle exit area ($A_1$) and a clean position in which the nacelle defines a second primary fan nozzle exit area ($A_2$) less than the first primary fan nozzle exit area $A_1$, wherein in the forward deployed position, the aft nacelle segment is at least partly located within the internal cavity.

13 Claims, 5 Drawing Sheets

(56) References Cited

U.S. PATENT DOCUMENTS

| | | |
|---|---|---|
| 3,096,617 A | 7/1963 | Bryant |
| 3,153,319 A | 10/1964 | Young et al. |
| 3,172,256 A | 3/1965 | Kerry et al. |
| 3,351,155 A | 11/1967 | Hoch et al. |
| 3,387,788 A | 6/1968 | Brown |
| 3,477,230 A | 11/1969 | Bauger et al. |
| 3,638,862 A | 2/1972 | Wildner |
| 3,685,738 A | 8/1972 | Leibach et al. |
| 3,837,580 A | 9/1974 | Camboulives et al. |
| 4,049,199 A | 9/1977 | Nightingale |
| 4,068,469 A | 1/1978 | Adamson |
| 4,132,068 A | 1/1979 | Johnston |
| 4,280,660 A | 7/1981 | Wooten, Jr. et al. |
| 4,311,276 A | 1/1982 | Hall |
| 4,440,346 A | 4/1984 | Wiley |
| 4,922,713 A | 5/1990 | Barbarin et al. |
| 5,359,851 A | 11/1994 | Bannerot et al. |
| 5,778,659 A | 7/1998 | Duesler et al. |
| 5,806,302 A | 9/1998 | Cariola et al. |
| 5,996,937 A | 12/1999 | Gonidec et al. |
| 8,549,834 B2 * | 10/2013 | Do .................. F02K 1/06 181/213 |
| 2002/0073691 A1 | 6/2002 | Rey et al. |
| 2006/0150612 A1 * | 7/2006 | Anderson .......... F02K 1/002 60/204 |
| 2008/0000235 A1 | 1/2008 | Hanson |
| 2009/0235638 A1 | 9/2009 | Jain et al. |
| 2009/0245997 A1 | 10/2009 | Hurwitz et al. |
| 2010/0011740 A1 | 1/2010 | McVey |
| 2010/0018213 A1 * | 1/2010 | Migliaro, Jr. ......... F02K 1/06 60/771 |
| 2012/0192543 A1 * | 8/2012 | Aeberli .............. F02C 7/24 60/204 |
| 2013/0092756 A1 | 4/2013 | Kennea et al. |
| 2013/0230391 A1 | 9/2013 | Hurlin et al. |
| 2015/0354499 A1 | 12/2015 | Caruel et al. |

FOREIGN PATENT DOCUMENTS

| | | |
|---|---|---|
| GB | 839230 A | 6/1960 |
| GB | 849334 A | 9/1960 |
| GB | 850508 A | 10/1960 |
| GB | 865881 A | 4/1961 |
| GB | 1119915 A | 7/1968 |
| GB | 1 260 268 A | 1/1972 |
| GB | 1 421 153 A | 1/1976 |
| JP | 2012-107633 A | 6/2012 |
| WO | 2008/045034 A1 | 4/2008 |
| WO | 2015/001276 A1 | 1/2015 |
| WO | 2015/155434 A1 | 10/2015 |

OTHER PUBLICATIONS

Nov. 18, 2016 Search Report issued in GB Patent Application No. 1609071.4.

* cited by examiner

AIRCRAFT GAS TURBINE ENGINE NACELLE

The present disclosure concerns an aircraft gas turbine engine fan nacelle having a variable area fan nozzle.

Aircraft gas turbine engines typically comprise a gas turbine engine core and a core driven fan enclosed within a fan nacelle. Air flows through the fan in use, and is divided into two airflows downstream—a bypass flow and a core flow. The ratio between the mass flow of air in the bypass flow to the airflow of the core flow is known as the bypass ratio. At subsonic velocities, a large bypass ratio is desirable for high efficiency. A large bypass results in a fan having a low pressure ratio (i.e. a low ratio of total pressure rearward of the fan to total pressure forward of the fan). Such fans may be susceptible to flutter or instability during certain phases of flight. Consequently, it is often desirable to modulate the area of the duct downstream of the fan to thereby modulate the pressure ratio across the fan, and thereby control flutter.

European patent application EP 2584184 discloses a variable area nozzle having a translating aft portion of a nacelle, which translates relative to a forward portion. The aft portion moves rearwardly to open up a secondary outlet-flow path between the forward and aft portions, thereby increasing the area downstream of the fan. However, the propulsive efficiency of this secondary outlet flow path is relatively low, since the air directed thereby has a radial component. Furthermore, the circumferentially extending secondary flow path in the outer surface may cause aerodynamic inefficiency. Furthermore, where the engine is installed beneath a wing of the aircraft, airflow through the secondary flow path at the top of the engine will interfere with the wing, thereby reducing lift and increasing drag. Finally, such a design is likely to increase noise when the secondary outlet nozzle is open, in view of the mixing of the fan and ambient airflows.

It is desirable to provide a gas turbine engine nacelle having a reliable variable area fan nozzle which is one or more of aerodynamically efficient, lightweight and quiet in operation.

According to a first aspect of the invention there is provided a fan nacelle for an aircraft gas turbine engine, the nacelle comprising:

an aft nacelle portion comprising a radially outer surface and a radially inner surface, the radially outer and inner surfaces defining an internal cavity therebetween;

an aft nacelle segment translatable along a translation vector having an axial component, wherein the aft nacelle segment is configured to translate between a forward deployed position in which the nacelle defines a first primary fan nozzle exit area and a clean position in which the nacelle defines a second primary fan nozzle exit area less than the first primary fan nozzle exit area, wherein in the forward deployed position, the aft nacelle segment is at least partly located within the internal cavity.

Advantageously, the translatable aft nacelle segments provide a variable fan nozzle exit area, while interfering with airflow over the aft portion of the nacelle to a lesser extent than previous designs. Consequently, aerodynamic efficiency is increased, and noise is reduced.

The aft nacelle segment translation vector may have an axial component, a radial component and an angular component. The aft nacelle segments may be configured to translate rearwardly and radially inwardly from the forward deployed position to the rearward deployed position.

The aft nacelle segment may be configured to pivot such that an aft end of the aft nacelle segment moves radially inwardly relative to the forward end when moving from the forward deployed position to the rearward deployed position.

The aft nacelle segment may be configured to translate rearwardly from the clean position to a rearward deployed position, in which a third primary fan nozzle exit area less than the second primary fan nozzle exit area is defined.

The aft nacelle portion may comprise a plurality of segments. Each segment or a subset of segments may be independently actuable. Advantageously, fine control over the fan nozzle exit area can be provided by actuating a subset of segments. Furthermore, thrust vector control can be provided, by translating segments in a non-symmetric manner.

Where the aft nacelle portion comprises a plurality of segments, the aft nacelle portion may comprise a plurality of nacelle fingers extending generally axially between adjacent segments.

Each nacelle finger may comprise a rail configured to support each adjacent segment. Advantageously, the segments are supported in flight, thereby preventing deflection.

The aft nacelle portion may extend part annularly, and may extend around a side portion of the nacelle.

Each segment may have spaced parallel sides extending in a direction parallel to a plane coincident with both the translation vector V of the respective segment and the engine axis. Sides of each nacelle finger may extend in a direction parallel to the adjacent segment side. Consequently, any gaps between the segments extend in a generally axial direction (i.e. in a direction extending from the forward end to the rearward end), thereby providing a minimum of flow disruption, and so a reducing drag compared to previous designs.

According to a second aspect of the present invention, there is provided a gas turbine engine comprising a nacelle in accordance with the first aspect of the invention.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which:

FIG. 1 is a sectional side view of a gas turbine engine;

FIGS. 2*a-d* are perspective side views from an aft end of a gas turbine engine nacelle in accordance with the present disclosure in clean, partial forward deployment, full forward deployment and full rearward deployment positions respectively;

FIG. 3 is a perspective side view of part of the engine nacelle shown in FIG. 2*d*;

FIGS. 4*a-c* are cross sectional side views of the gas turbine engine nacelle of FIG. 2 in the clean nozzle, forward deployment and rearward deployment positions respectively;

Figure 7A:
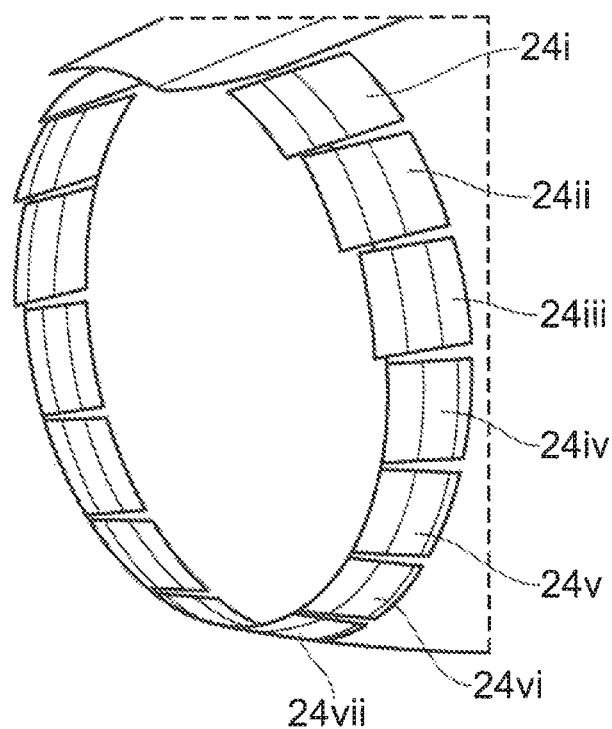

FIGS. 7*a* and *b* are perspective views from an aft end of the gas turbine engine nacelle of FIGS. 2*a-d* use new images.

Figure 1:
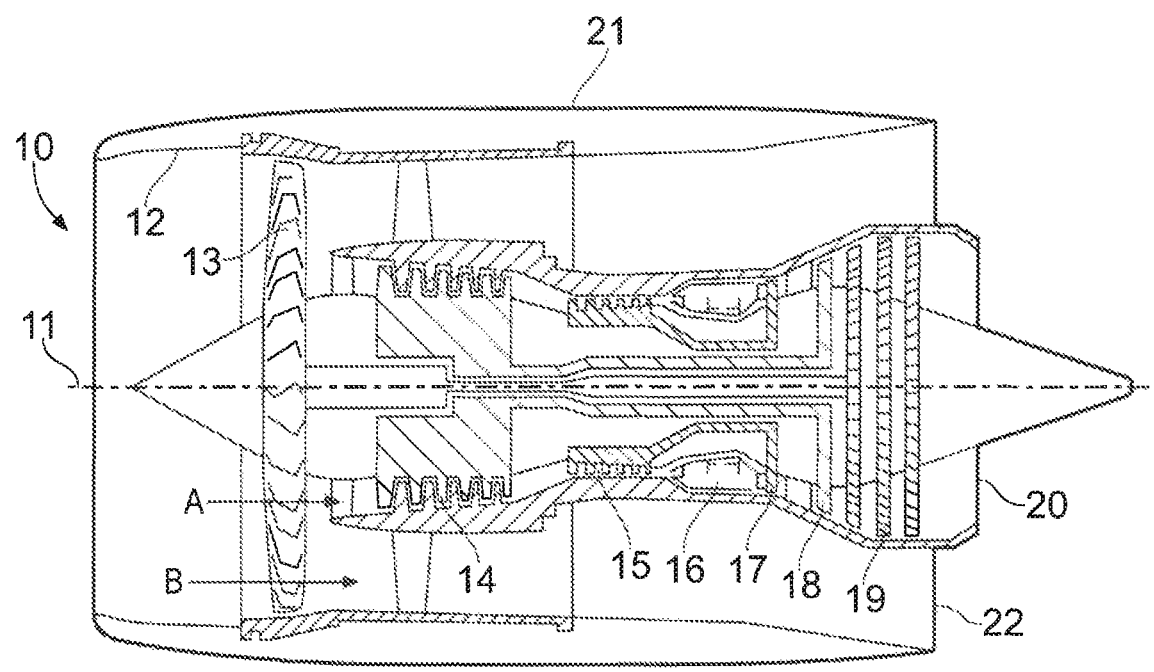

With reference to FIG. 1, a three shaft gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A fan nacelle 21 generally surrounds the engine 10 and defines both the intake 12 and a primary fan exhaust nozzle 22.

The gas turbine engine 10 works in the conventional manner so that air entering the intake 12 is accelerated by the fan 13. Downstream of the fan 12 the air stream is divided into two separate airflows—a first air flow A flows into the intermediate pressure compressor 14 in use, and a second air flow B passes through a bypass duct B to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the core nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

The engine comprises a fan nacelle 21. The nacelle 21 comprises an aft portion 23 (which may form part of a thrust reverser unit and so be moveable, or may be fixed) and a plurality of aft, translatable portions in the form of segments 24. In the embodiment shown, a total of fourteen generally axially translatable segments 24 are provided, with seven being provided on a port side of the nacelle 21, and a further seven being provided on a starboard side. The nacelle 21 further comprises an upper thrust reverser track fairing 25, and a lower thrust reverser track fairing (not shown). No translatable segments 24 are provided within either the upper thrust reverser track fairing 25 or the lower thrust reverser track fairing, since an engine pylon (not shown) and lower bifurcation (not shown) at these locations would interfere with the aft translatable segment movement.

The aft nacelle 23 further comprises a plurality of recesses 44, defined by axially extending nacelle fingers 27. Each nacelle finger 27 is fixed to the aft nacelle 23. Each nacelle finger 27 comprises a radially inner surface 46 and a radially outer surface 47 which converge in an aft direction.

Figures 2A, 2B:
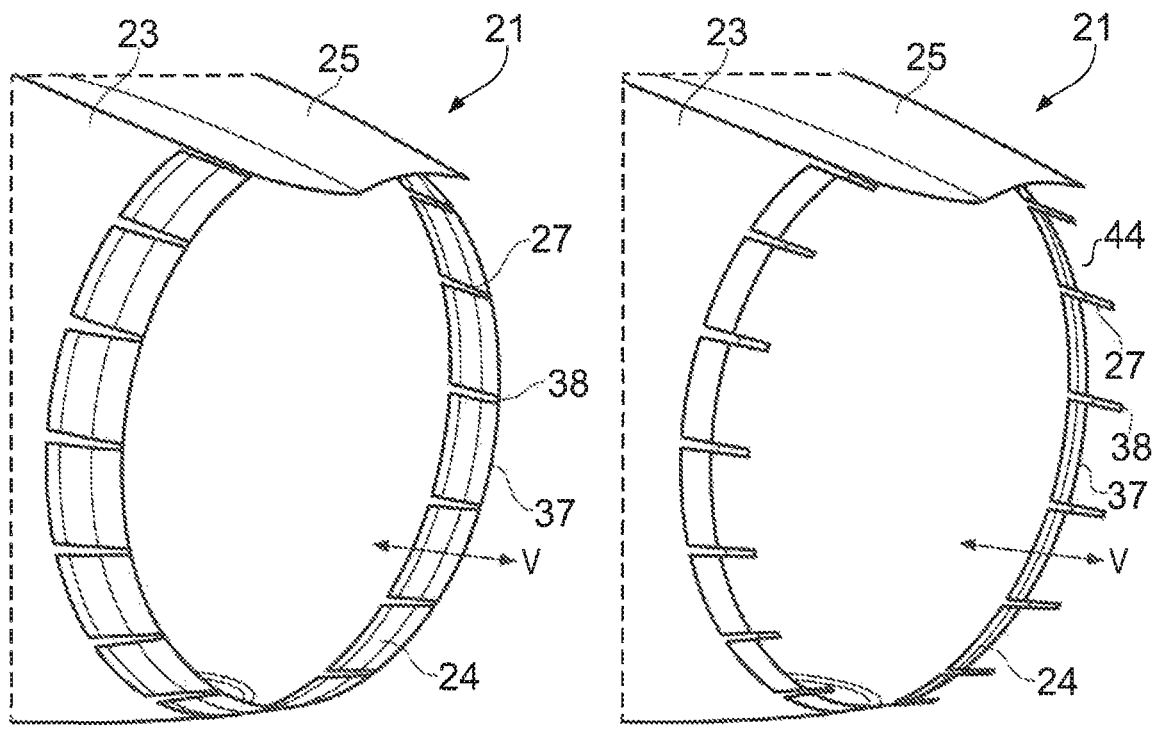

Each segment 24 is moveable along a translation vector V between a full forward deployed position (shown in FIG. 2c) and a full rearward deployed position (shown in FIG. 2d) via an intermediate partially forward deployed position (shown in FIG. 2b) and a stowed, clean nozzle position (shown in FIG. 2a).

Figure 4A:
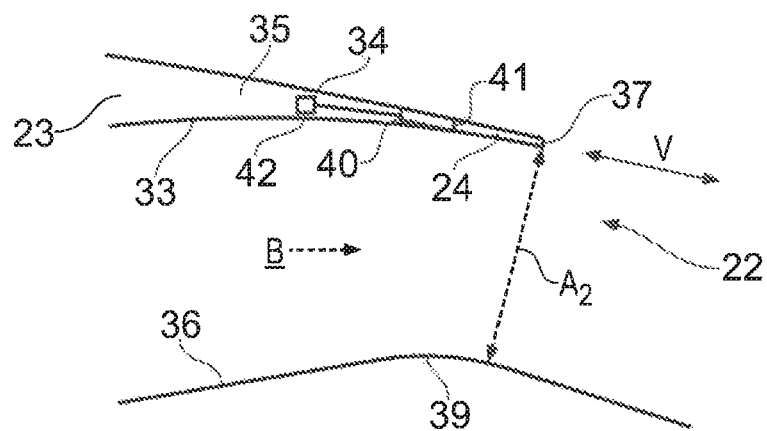
Figure 4B:
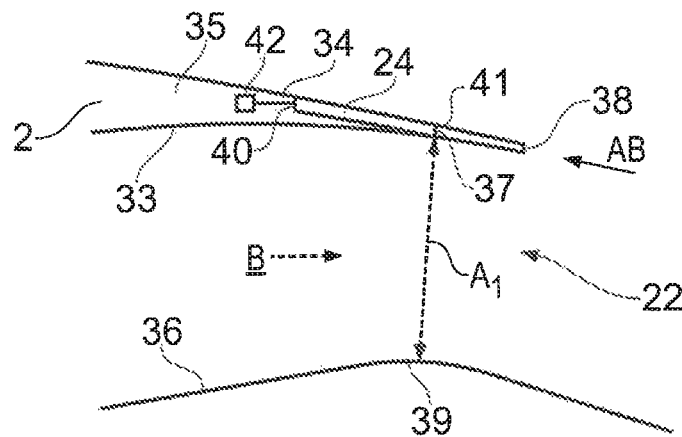
Figure 4C:
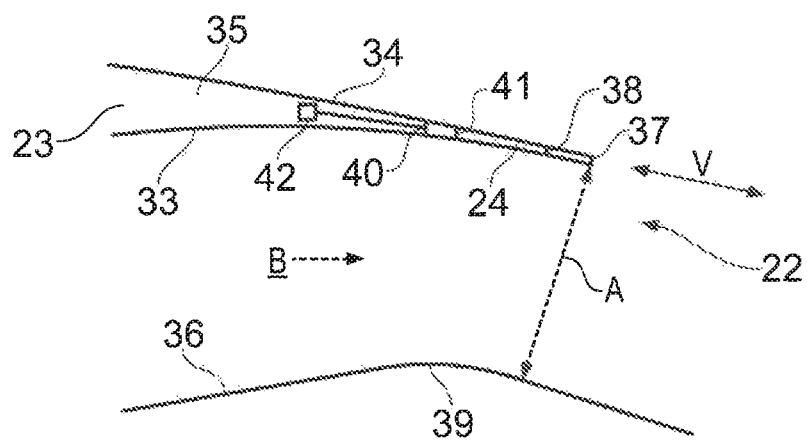

As shown in FIGS. 4a-c, the aft nacelle 23 comprises radially inner 33 and radially outer 34 sheet sides which define a cavity 35 therebetween. In gas turbine engine terminology, the radially outer surface 34 may be referred to as an outer cowl, while the radially inner surface 33 may be referred to as the by-pass duct outer wall or OFS. The cavity 35 has a radial extent greater than a radial thickness of the forward end of the aft translatable segment 24, and a sufficient axial extent such that at least a portion of the aft translatable segment can locate within the cavity 35.

As can be seen from FIGS. 4a-c, the gas turbine engine 10 further comprises a core nacelle 36 (also known as the by-pass duct inner wall or IFS in gas turbine terminology). The core nacelle 36 encloses the compressors 14, 15, combustor 16 and turbines 17, 18, 19. As can be seen from FIG. 1 and FIGS. 4a-c, the radial extent of the core nacelle 36 varies along the engine axis. The radial extent of the core nacelle 36 generally increases toward the aft end of the low pressure turbine 19, then decreases again downstream, such that a "turbine hump" 39 is defined at the axial location of the core nacelle 36 maximum radius. In other words, the turbine hump represents the maximum radius of the core nacelle 36 adjacent the turbine section.

Figure 5:
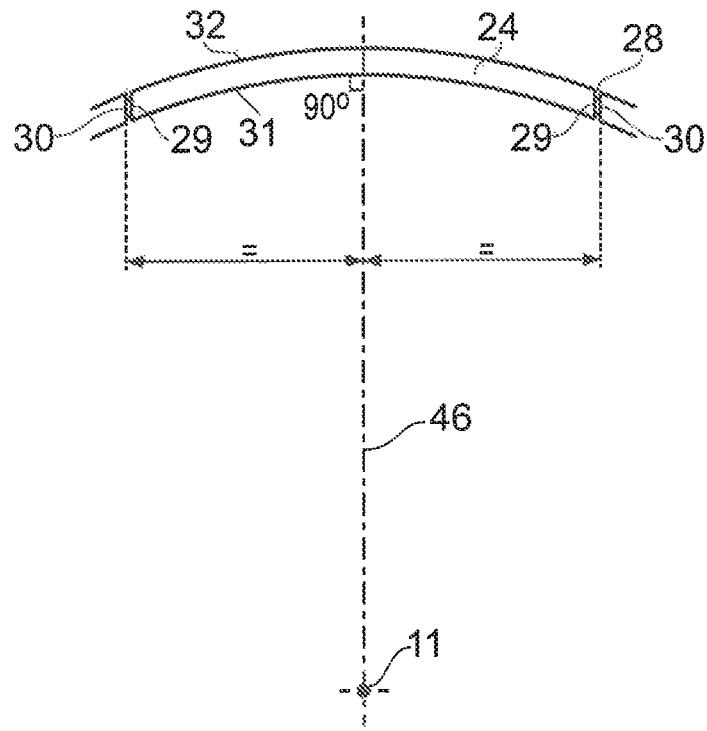
FIG. 5 is a view along arrow AB in FIG. 4*b*.

Referring to FIG. 5, which shows a segment 24 in the clean position, generally axially extending sides 29 of the aft translatable segments 24 extend in a direction parallel to a plane coincident with both the translation vector V of the respective segment 24 and the engine axis 11. Radially inner 31 and radially outer 32 sides of each aft translatable segment 24 are generally curved radially concave and radially convex respectively to match the curvature of the remainder of the nacelle 21.

Each aft translatable segment 24 is angled radially inwardly by several degrees from a leading edge 40 to a trailing edge 37, such that the generally axially translatable segments are moveable in a direction V that has a radial component, such that a trailing edge 37 moves somewhat radially inwardly when moving from a forward deployed to a rearward deployed position.

In view of the differing circumferential position of each aft translatable segment 24, the translation vector V for each aft translatable segment 24 may be defined using cylindrical polar co-ordinates having a common origin point, a common axial component, a common radial component and a unique angular component. The vector V of each aft translatable segment 24 generally converges on a point downstream of the primary nozzle 22.

Figures 2C, 2D:
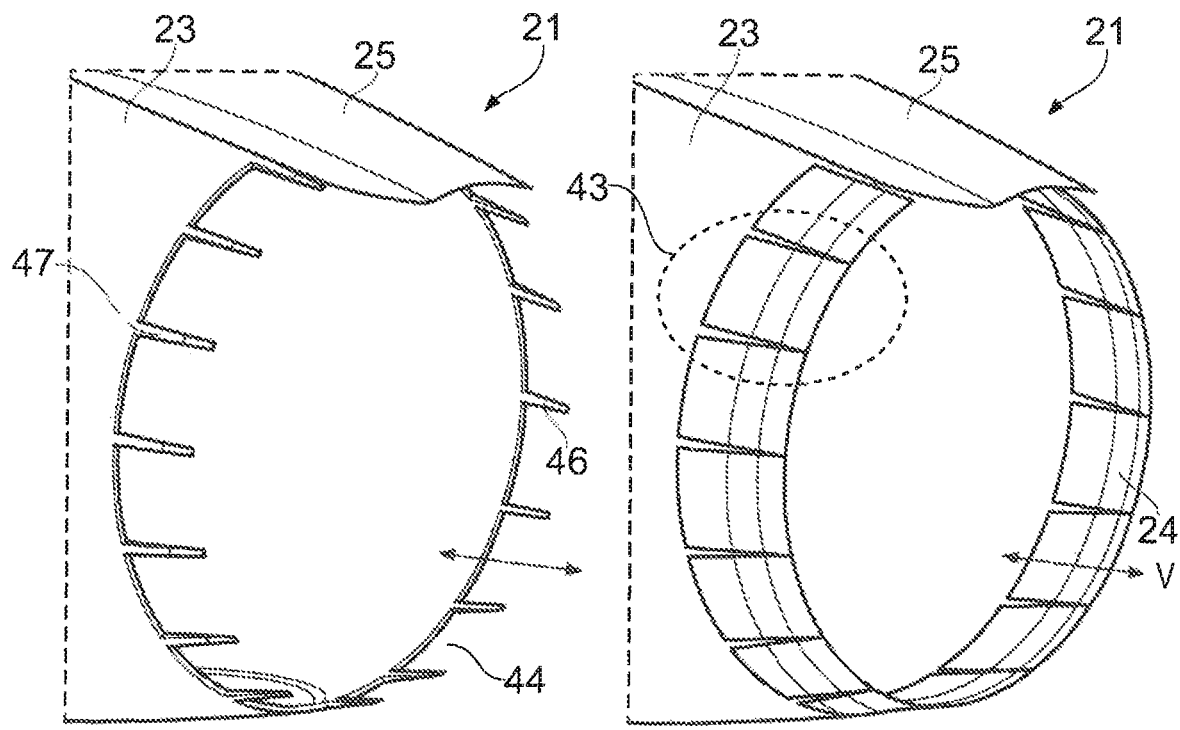
Figure 3:
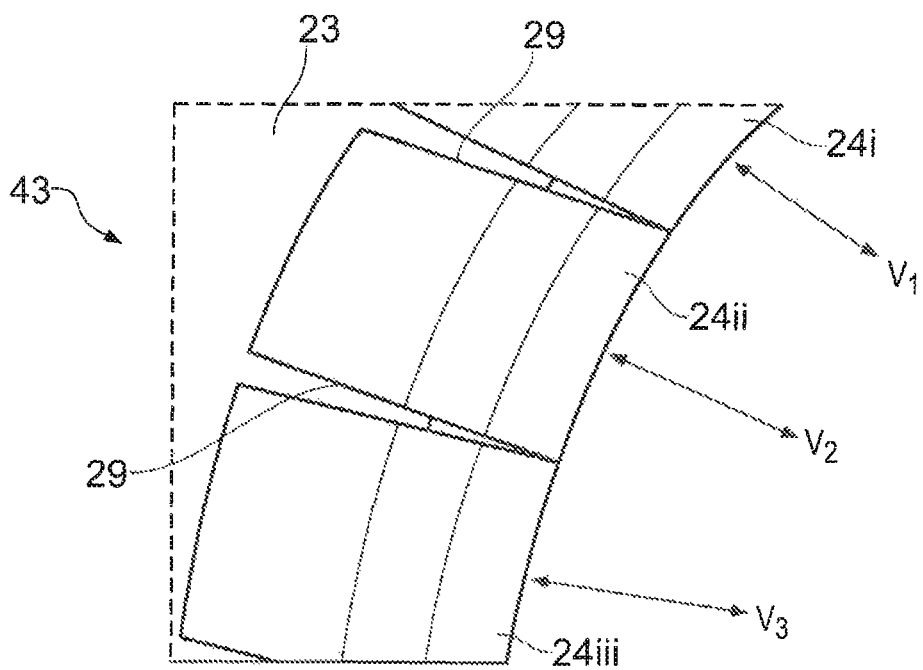

FIG. 3 shows an enlarged view of area 43 of the aft nacelle 23 in the reardly deployed position, as shown in FIG. 2d. As can be seen, first, second and third port side aft translatable segments $24_i$, $24_{ii}$, $24_{iii}$, are shown. Each segment $24_i$, $24_{ii}$ and $24_{iii}$ has a unique translation vector $V_i$, $V_{ii}$ and $V_{iii}$. As can be seen, these individual vectors converge downstream of the nacelle trailing edge.

Siting of each nacelle finger 27 side wall 30 in relation to the adjacent side wall 29 of the adjacent aft translatable segment 24 defines a parallel gap 28 to permit relative movement therebetween. As can be seen therefore, the gap 28 extends in a direction parallel to the respective aft translatable segment 24 translation vector V. The gap 28 also therefore extends generally parallel to both the external airflow around the nacelle 21, and the internal propulsive airflow within the nacelle 21. Consequently, this gap 28 provides relatively little interference with airflow, and so produces relatively little drag in operation.

In view of the parallel sides 29 of the aft translatable segments 24, and the radially inward component of motion of the aft translatable segments 24, when translated rearwardly the nacelle fingers 27 are tapered from a circumferentially thicker forward end to a thinner aft end, such that the parallel gap 28 is maintained along the generally axial length of the translatable segments 24. As will be appreciated from the drawings, the nacelle fingers 27 are tapered such that sides 29 of each nacelle finger 27 extend in a direction parallel to the side of the adjacent translatable segment 24. Since the translation vectors V converge, the nacelle fingers 27 narrow in an aft direction.

FIGS. 2a and 4a show the aft translatable segments 24 in the clean nozzle position. As can be seen, the trailing edge 37 (i.e. an aft end) of the aft translatable segment 24 shown in these figures is positioned at the same axial position as a trailing edge 38 of the nacelle finger 27. Consequently, the trailing edges 37, 38 of the aft translatable segments 24 and nacelle fingers 27 respectively provide a substantially continuous annular nacelle trailing edge, and so provide a low nacelle drag in operation. The core nacelle 36 and trailing edges 37, 38 of the aft translatable segments 24 and nacelle fingers 27 define a second primary geometric fan nozzle exit area $A_2$, as shown in FIG. 4a. The primary geometric fan nozzle exit area $A_2$ could be defined as the area of the nozzle at the trailing edge of the nozzle swept by a notional line extending a minimum distance between the trailing edge of the fan nacelle 21 and the radially outer surface of the core nacelle 36. Again referring to FIG. 4a, the forward face 40 of the axially aft translatable segment 24 is forward of the recess forward circumferential edge 41 forward. Consequently, no significant gaps or steps are provided in the nacelle radially inner or radially outer surfaces 33, 34, thereby again minimising drag.

Each aft translatable segment 24 is moveable by a respective actuator 42, one of which is shown in FIGS. 4a-c.

FIGS. 2c and 4b show the aft translatable segments 24 in a forward deployed position. As can be seen, the trailing edge 37 of the translatable segment 24 is positioned axially forward of the trailing edge 38 of the nacelle finger 27. The trailing edges 37 of the aft translatable segments 24 effectively define a nacelle trailing edge, and so a first primary geometric fan nozzle exit area $A_1$. Again referring to FIG. 4b, the forward edge 40 of the aft translatable segment 24 is provided axially forwardly of the recess forward edge 41 of the aft nacelle 23 of the nacelle 21. Consequently, at least a part of the aft translatable segment 24 is located within the forward nacelle cavity 35, between the radially inner 33 and outer 34 nacelle surfaces. Consequently therefore, substantially continuous radially inner and outer surfaces are provided, with only very small steps or discontinuities, which may not cause significant turbulence or drag at the typical Reynolds numbers encountered during operation.

FIG. 2b shows the aft translatable segment 24 at an intermediate position between the forwardly deployed and clean nozzle positions. Consequently, a primary fan nozzle exit area between the first and second areas $A_1$, $A_2$ can be provided. Consequently, the primary nozzle area can be finely controlled. It will also be appreciated that, in view of the independent actuators 42, each individual aft translatable segment 24 can be controlled independently of the others, thereby providing further control. Given the circumferential distribution of the aft translatable segments 24, movement of the segment 24 individually can be used to provide thrust vector control, particularly where the translation vector V has a significant radial component.

Optionally, the aft translatable segment 24 may be moveable to an rearward deployed position. FIGS. 2d and 4c show the axially moveable portions 24 in the rearward deployed position. As can be seen, in the rearward deployed position, the trailing edges 37 of the aft translatable segments 24 extend rearwardly compared to the positions of the segment trailing edges 37 at either the forward or clean nozzle positions. Consequently, a third primary geometric fan nozzle exit area $A_3$ is defined, in which the primary geometric fan nozzle exit area $A_3$ is less than the second primary geometric fan nozzle exit area $A_2$. As can be seen in FIG. 3, a small gap is provided between adjacent aft translatable portions in this position, which may slightly increase drag. However, the propulsive benefits of this position may outweigh any increase in drag.

Figure 6:
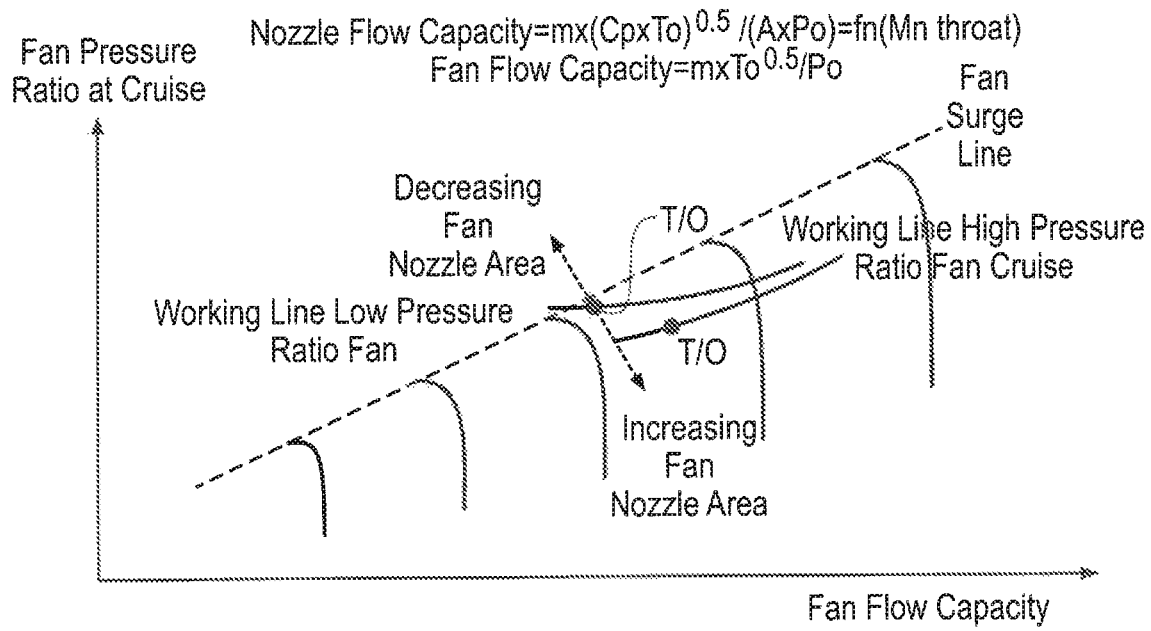
FIG. 6 is a graph showing the relationship between fan pressure ratio and fan flow capacity at cruise for both a low pressure ratio fan and a high pressure ratio fan for the gas turbine engine of FIGS. 2*a-d*

FIG. 6 shows a graph illustrating the fan pressure ratio plotted against fan flow capacity at cruise. A fan surge line is defined by a substantially constant ratio between fan pressure ratio and fan flow capacity. Operation at a fan pressure ratio greater than the surge line will result in fan instability, which can result in flutter, stall and therefore inefficient operation and/or engine damage. A working line is defined as the relationship between fan pressure ratio and fan flow capacity during typical operation. FIG. 5 shows the working line for a low pressure ratio fan and a high pressure ratio fan. The present invention is thought to be particularly suitable for low pressure ratio fans having a fan pressure ratio less than 1.4 at cruise. As can be seen, at takeoff conditions (see the point on the graph labelled "T/O"), the fan pressure ratio is close to the surge line in the case of the low pressure ratio fan. By moving the aft translatable segments 24 from the clean nozzle position to the forward deployed position, the primary geometric fan nozzle area A is increased, so reducing the fan pressure ratio for a given flow capacity, and moving the working line away from the surge line. Conversely, moving the aft translatable segments 24 from the clean position to the rearward deployed position or the extended position increases the fan pressure, thereby moving the fan toward the surge line. However, in view of the increased pressure ratio, propulsive efficiency at high speeds will be increased.

Typically, the aft translatable segments 24 will therefore be positioned at the clean nozzle position during cruise. In this position, minimum drag is provided, and the primary geometric fan nozzle exit area $A_2$ corresponds to the area that provides maximum propulsive efficiency at cruise speeds and altitudes. The aft translatable segments 24 will be moved to the forward deployed position during operation at high power conditions at low altitudes and speeds, to provide improved fan margin, and to thereby reduce the risk of fan instability. Where the aft translatable segments 24 can be deployed rearwardly from the clean position to the rearward deployed position, this may be employed during cruise at high altitude and high speeds, to further increase propulsive efficiency at the expense of higher drag.

Figure 7B:
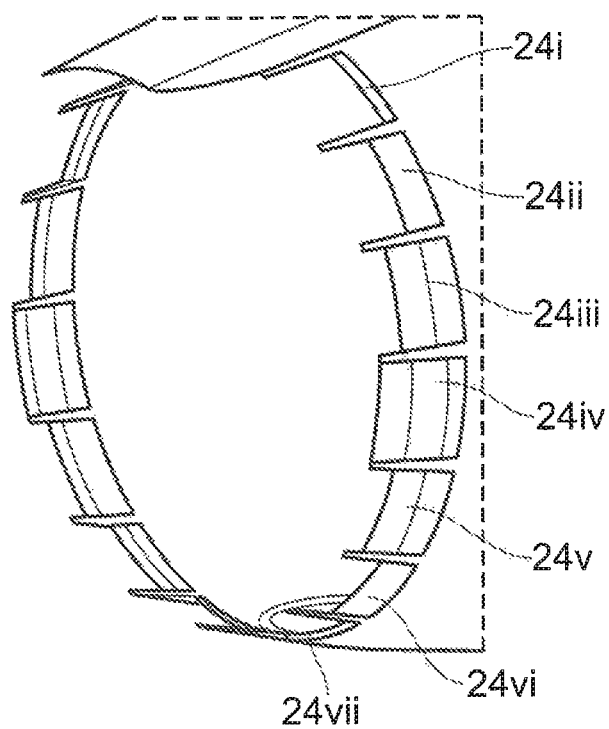

Through partial deployment of selective aft nacelle segments 24, the fan nozzle exit area can be trimmed during the flight cycle so as to match the locus of peak performance of the fan which typically varies throughout the flight cycle as a result of one or more of decreasing airframe weight through fuel burn, differing cruise altitudes, and the prevailing atmospheric conditions. FIGS. 7a and 7b show two such examples of partial segment deployment.

FIG. 7a shows an example operational configuration in which the aft translatable segments 24 are positioned unequally. Aft translatable segments $24_i$, $24_{ii}$, $24_{iii}$ are each deployed rearwardly of the clean nozzle position, i.e. with their respective trailing edges 37 rearwardly of the trailing edge of the nacelle fingers 27 to varying degrees. Meanwhile, aft translatable segments $24_{iv}$ to $24_{vii}$ are each located at their respective clean positions, with their trailing edges 37 adjacent the trailing edges of the nacelle fingers 27.

FIG. 7b shows a further example operational configuration, in which the aft translatable segments 24 are positioned unequally. Translatable segments $24_i$, $24_{ii}$, $24_{iii}$, $24_v$, $24_{vi}$, $24_{vii}$ are each deployed forwardly of the clean nozzle position, i.e. with their respective trailing edges 37 forwardly of the trailing edge of the nacelle fingers 27 to varying degrees. Translatable segment $24_{iv}$ is in the clean nozzle position, with its trailing edge 37 adjacent the trailing edges of the adjacent nacelle fingers 27.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, different numbers of aft translatable segments may be provided. The aft translatable segments may be actuable by a single common actuator, rather than being independently actuable. The aft translatable segments may not be evenly spaced. The aft translatable segments may also have different dimensions, such as different circumferential widths, relative to one another. The aft translatable segments may not be symmetric about the engine vertical centreline, with more or fewer, or differently dimensioned aft translatable segments being provided on the port side relative to the starboard side.

The nacelle may be useable with a gas turbine engine having a different configuration. For example, the fan may comprise a multi-stage fan, having a plurality of rotor and stator stages. The core could comprise a single spool or two spool core, in which a single shaft and two shafts respectively interconnect the fan, compressors and turbines.

The nacelle may comprise a thrust reverser unit. The nacelle may comprise a fixed forward portion and an axially moveable aft portion, the axially moveable aft portion being moveable rearwardly to open a radial gap between the fixed forward and axially moveable aft portions to define a secondary outlet nozzle, to thereby provide reverse thrust. The aft portion may be moveable relative to the moveable portion of the forward nacelle portion.

The aft translatable portion may also be configured to pivot when translating between the forward and rearward positions. For example, the guide and the sides may be curved, such that the rearward end pivots relative to the forward end when translating between the forward and rearward positions. In particular, the sides may be curved inwardly, such that the rearward end of the aft translatable portion pivots radially inwardly relative to the forward end of the aft translatable portion when moving from the forward to the rearward position. Consequently, the primary nozzle outlet area can be varied to a larger degree with less axial translation.

In the embodiments described herein, the trailing edges of the aft translatable segments extend forwardly of the core nacelle trailing edge in all positions. However, it will be understood that the present invention is equally applicable to nacelles in which the trailing edge of the fan nacelle extends further rearwardly than the trailing edge of the core nacelle.

It will be appreciated that the drawings are not to scale.

The invention claimed is:

1. A fan nacelle for an aircraft gas turbine engine, the nacelle comprising:
   an aft nacelle portion comprising a radially outer surface and a radially inner surface, the radially outer and inner surfaces defining an internal cavity therebetween; and
   an aft nacelle segment translatable along a translation vector having an axial component, wherein the aft nacelle segment is configured to translate between a forward deployed position in which the nacelle defines a first primary fan nozzle exit area and a clean position in which the nacelle defines a second primary fan nozzle exit area less than the first primary fan nozzle exit area, wherein in the forward deployed position, the aft nacelle segment is at least partly located within the internal cavity, wherein
   the aft nacelle portion includes a nacelle finger, the nacelle finger including a first side and a second side opposite to the first side in a circumferential direction, and the first side and the second side converge in an aft direction, the first side facing the aft nacelle segment along the circumferential direction.

2. A fan nacelle according to claim 1, wherein the aft nacelle segment translation vector has an axial component, a radial component and an angular component.

3. A fan nacelle according to claim 2, wherein the aft nacelle segment is configured to translate rearwardly and radially inwardly from a forward deployed position to the clean position.

4. A fan nacelle according to claim 1, wherein the aft nacelle segment is configured to pivot such that an aft end of the aft nacelle segment moves radially inwardly relative to the forward end when moving from a forward deployed position to the clean position.

5. A fan nacelle according to claim 1, wherein the aft nacelle segment is configured to translate rearwardly from the clean position to a rearward deployed position, in which the nacelle defines a third primary fan nozzle exit area less than the second primary fan nozzle exit area.

6. A fan nacelle according to claim 1, wherein the aft nacelle segment is one of a plurality of aft nacelle segments.

7. A fan nacelle according to claim 6, wherein each aft nacelle segment has spaced parallel sides extending in a direction parallel to the translation vector of the respective aft nacelle segment.

8. A fan nacelle according to claim 7, wherein one of the spaced parallel sides facing one of the first side and the second side of the aft nacelle finger along the circumferential direction.

9. A fan nacelle according to claim 6, wherein each segment or a subset of the plurality of the aft nacelle segments is independently actuable.

10. A fan nacelle according to claim 6, wherein the nacelle finger extends generally axially between adjacent ones of the aft nacelle segments.

11. A fan nacelle according to claim 10, wherein the nacelle finger is one of a plurality of nacelle fingers of the aft nacelle portion, and first and second sides of each nacelle finger extend in a direction parallel to an adjacent aft nacelle segment side.

12. A fan nacelle according to claim 1, wherein the aft nacelle portion extends part annularly, and may extend around a side portion of the nacelle.

13. A gas turbing engine comprising a nacelle in accordance claim 1.

* * * * *